(12) United States Patent
Zeng et al.

(10) Patent No.: US 11,962,108 B2
(45) Date of Patent: Apr. 16, 2024

(54) ANTI-ELECTRIC SHOCK MECHANISM FOR A POWER CONVERTER

(71) Applicant: Dongguan Best Travel Electronics Co., Ltd., Dongguan (CN)

(72) Inventors: Guangli Zeng, Dongguan (CN); Chengbing Wang, Dongguan (CN); Feng Wang, Dongguan (CN)

( * ) Notice: Subject to any disclaimer, the term of this patent is extended or adjusted under 35 U.S.C. 154(b) by 71 days.

(21) Appl. No.: 17/749,717

(22) Filed: May 20, 2022

(65) Prior Publication Data

US 2022/0376426 A1 Nov. 24, 2022

(30) Foreign Application Priority Data

May 21, 2021 (CN) .......................... 202121114075.4

(51) Int. Cl.
| | | |
|---|---|---|
| H01R 13/443 | (2006.01) | |
| H01H 85/22 | (2006.01) | |
| H01R 13/639 | (2006.01) | |
| H01R 13/68 | (2011.01) | |
| H01R 13/688 | (2011.01) | |
| H01R 31/06 | (2006.01) | |
| H02M 7/00 | (2006.01) | |

(52) U.S. Cl.
CPC .......... *H01R 13/443* (2013.01); *H01H 85/22* (2013.01); *H01R 13/639* (2013.01); *H01R 13/68* (2013.01); *H01R 13/688* (2013.01); *H01R 31/065* (2013.01); *H02M 7/003* (2013.01)

(58) Field of Classification Search
CPC .... H01R 13/443; H01R 13/639; H01R 13/68; H01R 13/688; H01R 31/065; H02M 7/003; H01H 9/20; H01H 85/22; H01H 85/0241; H01H 85/202; H01H 85/25
See application file for complete search history.

(56) References Cited

U.S. PATENT DOCUMENTS 10,673,192 B1 * 6/2020 Liu .................... H01R 31/06
2022/0337009 A1 * 10/2022 Zeng .................... H01R 13/629

FOREIGN PATENT DOCUMENTS

| CN | 100557891 C | * 11/2009 | ............. H01R 27/00 |
| CN | 215070684 U | 12/2021 | |

OTHER PUBLICATIONS

Machine Translation of CN_100557891_C, (Nov. 4, 2009) (Year: 2023).*

* cited by examiner

*Primary Examiner* — Travis S Chambers (57) ABSTRACT

The present invention discloses an anti-electric shock mechanism for a power converter comprising a protective tube provided in the power converter and further comprising a locking guide block provided in the power converter, and a protective holder for mounting the protective tube, wherein a locking groove is formed on the protective holder, and a locking part inserted into the locking groove is provided on the locking guide block. The anti-electric shock mechanism for the power converter provided by the present invention can prevent the risk of electric leakage and electric shock when the power converter is used, whether the protective tube has not been pulled out, is partially pulled out or has been completely pulled out, so as to improve the safety of the power converter.

10 Claims, 13 Drawing Sheets

ANTI-ELECTRIC SHOCK MECHANISM FOR A POWER CONVERTER

TECHNICAL FIELD the present invention relates to the field of power converters, and in particular to an anti-electric shock mechanism for a power converter.

BACKGROUND

During the use of the power converter, since there is no safety requirement for the size of the outer edge of the socket, the distance of the edges of many sockets on the market is relatively small. When the pins are pushed out for use, if the protective tube is not completely placed in the contact surface between the plug and the socket, the protective tube may be pulled out, resulting in the risk of leakage current and electric shock. Especially when naughty children pull out the protective tube during the use, there will be great safety problems and low use security.

SUMMARY

In view of the above-mentioned deficiencies, the purpose of the present invention is to provide an anti-electric shock mechanism for a power converter, which can prevent the risk of electric leakage and electric shock when the power converter is used, whether the protective tube has not been pulled out, is partially pulled out or has been completely pulled out, so as to improve the safety of the power converter.

The present invention adopts the following technical solutions to achieve the above-mentioned purpose.

An anti-electric shock mechanism for a power converter comprising a protective tube provided in the power converter is characterized by further comprising a locking guide block provided in the power converter, and a protective holder for mounting the protective tube, wherein a locking groove is formed on the protective holder, and a locking part inserted into the locking groove is provided on the locking guide block.

As a further improvement of the present invention, a first guide slope is formed on an upper surface of the locking part of the locking guide block, and a second guide slope matched with the first guide slope is formed on an upper inner wall of the locking groove.

As a further improvement of the present invention, a third guide slope is formed on an upper end face of the protective holder, and a fourth guide slope matched with the third guide slope is formed on a lower surface of the locking part of the locking guide block.

As a further improvement of the present invention, a guide groove is formed at a lower end surface of the locking guide block, and a guide stiffener movably clamped into the guide groove is provided in the power converter.

As a further improvement of the present invention, the locking guide block is provided on a side of the locking groove.

As a further improvement of the present invention, it further comprises a linkage block provided on a side of the locking guide block.

As a further improvement of the present invention, at least one limiting part is provided on a side of the linkage block away from the locking guide block, and the limiting part is provided in the direction of an Euro-standard pin assembly of the power converter; at least one avoidance groove for the limiting part to be clamped is formed on an outer side of the Euro-standard pin assembly.

As a further improvement of the present invention, a fifth guide slope is formed on an upper surface of the limiting part, and a sixth guide slope corresponding to the fifth guide slope is formed on an upper inner wall of the avoidance groove.

As a further improvement of the present invention, the linkage block is provided separately from the locking guide block.

As a further improvement of the present invention, a moving guide block is extended on an end portion of the locking guide block adjacent to the linkage block, an acting part is provided on an end portion of the linkage block adjacent to the locking guide block, and a moving guide groove in which the moving guide block is inserted is formed at a bottom of the acting part.

As a further improvement of the present invention, a protective tube insertion hole is formed at a position of the power converter corresponding to the protective holder, and a gap formed on the protective tube insertion hole is less than 3 mm when the protective tube is pulled out and the locking guide block is moved to the position of the protective tube insertion hole.

The beneficial effects of the present invention are as follows. The anti-electric shock mechanism composed of the locking part on the locking guide block and the locking groove on the protective tube or the special structural design combined of the linkage block can achieve the anti-electric shock function in the following three situations.

(1) When the protective holder and the protective tube are correctly installed in the power converter and the Euro-standard pin assembly is pushed out for use, i.e. when it is plugged in the socket and is powered on, the protective holder can be locked by combining the linkage block and the locking guide block. That is, the protective tube 3 is locked, so that the protective holder and the protective tube cannot be pulled out from the power converter when the power converter is working, thereby improving the safety of the power converter and preventing the risk of electric leakage and electric shock.

(2) When the protective holder and the protective tube have been partially pulled out, the protective holder exerts a force towards the Euro-standard pin assembly on the locking guide block and the linkage block, so that the limiting part of the linkage block is clamped into the avoidance groove of the Euro-standard pin assembly, and the locking guide block and the linkage block cannot move any more. Then the limiting part limits the Euro-standard pin assembly, so that the Euro-standard pin assembly cannot be pushed out for use, thereby ensuring the use safety, preventing the Euro-standard pin assembly from having a potential electric shock hazard when the protective holder and the protective tube are partially pulled out, and improving the use safety.

(3) When the protective tube and the protective tube have been completely pulled out from the power converter, the Euro-standard pin assembly is pushed out for use; at this moment, the Euro-standard pin assembly pushes the linkage block, and the linkage block pushes the locking guide block, so that the locking guide block moves to the position of the protective tube insertion hole, and the protective tube insertion hole is blocked. When the locking guide block moves to the position of the protective tube insertion hole, the gap formed on the protective tube insertion hole is less than 3 mm. That is to say, a probe with the safety standard being greater than or equal to 3 mm cannot be inserted into the gap, thereby ensuring that the protective tube insertion hole is not exposed, and preventing a potential safety hazard of electric shock from occurring. It conforms to safety standards and improves safety in use.

The above is an overview of the technical solution of the present invention, and the present invention is further described below in conjunction with the drawings and the specific embodiments.

DETAILED DESCRIPTION

In order to further clarify the technical means and effects adopted by the present invention to achieve the intended purpose, a detailed description of specific embodiments of the present invention will be given below with reference to the accompanying drawings and preferred embodiments.

Figure 1:
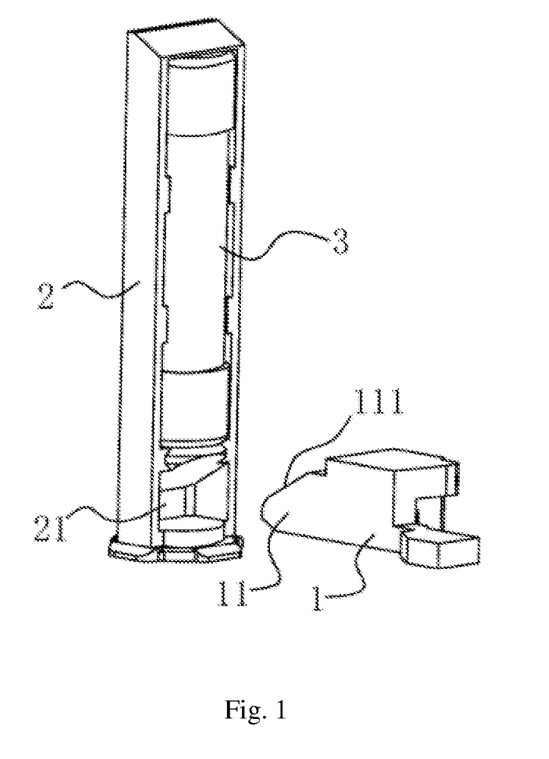
FIG. 1 is a structurally schematic view of an anti-electric shock mechanism in an unlocked state in the present invention.
Figure 2:
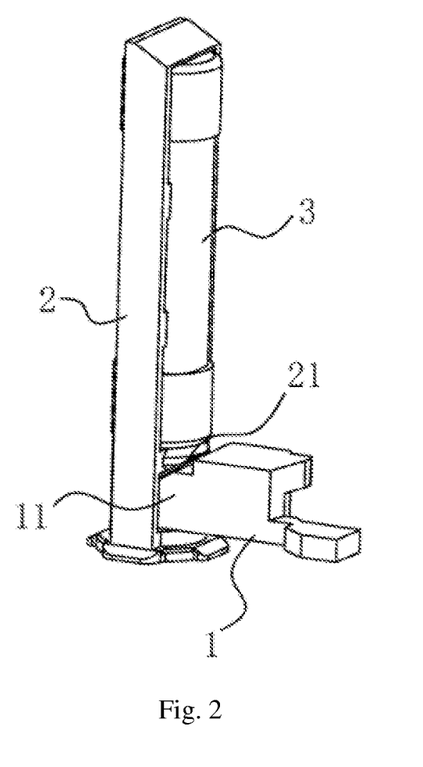
FIG. 2 is a structurally schematic view of an anti-electric shock mechanism in a locked state in the present invention.
Figure 9:
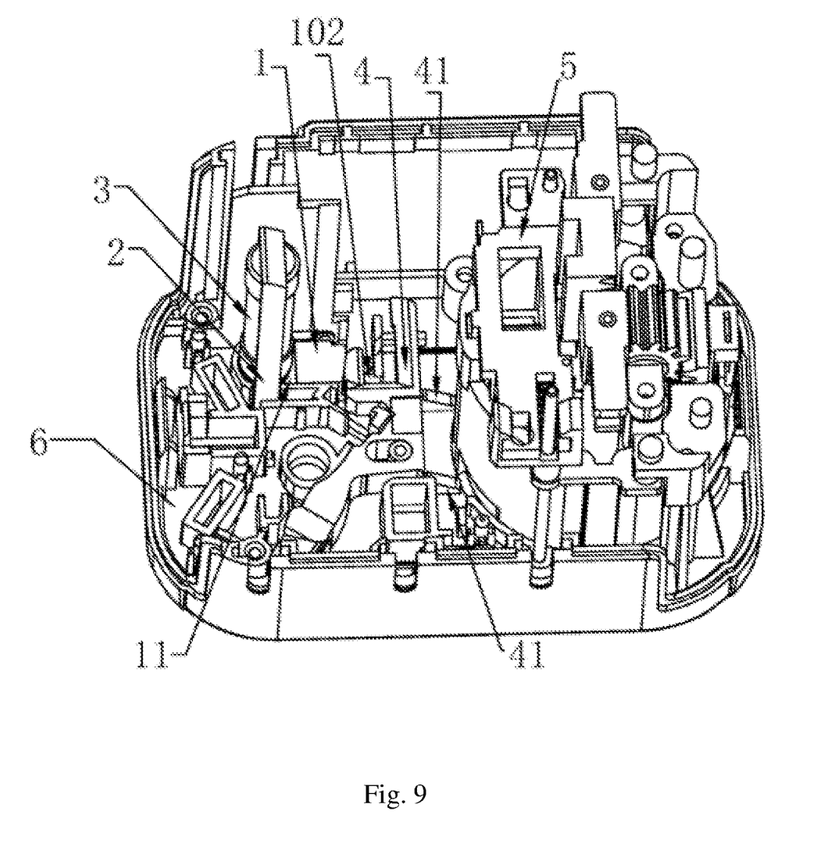
FIG. 9 is a perspective view of an anti-electric shock mechanism provided in a power converter housing and in a locked state in the present invention.

With reference to FIGS. 1, 2 and 9, an embodiment of the present invention provides an anti-electric shock mechanism for a power converter, including a protective tube 3 provided in the power converter, a locking guide block 1 provided in the power converter, and a protective holder 2 for mounting the protective tube 3, wherein a locking groove 21 is formed on the protective holder 2, and a locking part 11 inserted into the locking groove 21 is provided on the locking guide block 1. Specifically, the locking guide block 1 is provided on a side of the locking groove 21. Meanwhile, the protective tube 3 is mounted on the protective holder 2.

When a force is applied to the locking guide block 1 in the direction of the protective holder 2, the locking guide block 1 moves in the direction of the protective holder 2, so that the locking part 11 is inserted into the locking groove 21, as shown in FIG. 2, the protective holder 2 and the protective tube 3 are locked, and the protective holder 2 and the protective tube 3 cannot move.

The anti-electric shock mechanism of the present embodiment is applied to a power converter. In a specific product, the locking guide block 1, the protective holder 2 and the protective tube 3 are all installed in the power converter. When the locking guide block 1 locks the protective holder 2 and the protective tube 3, the protective holder 2 and the protective tube 3 cannot be pulled out from the power converter, thereby ensuring the safety of the power converter and preventing the risk of electric leakage and electric shock.

Figure 3:
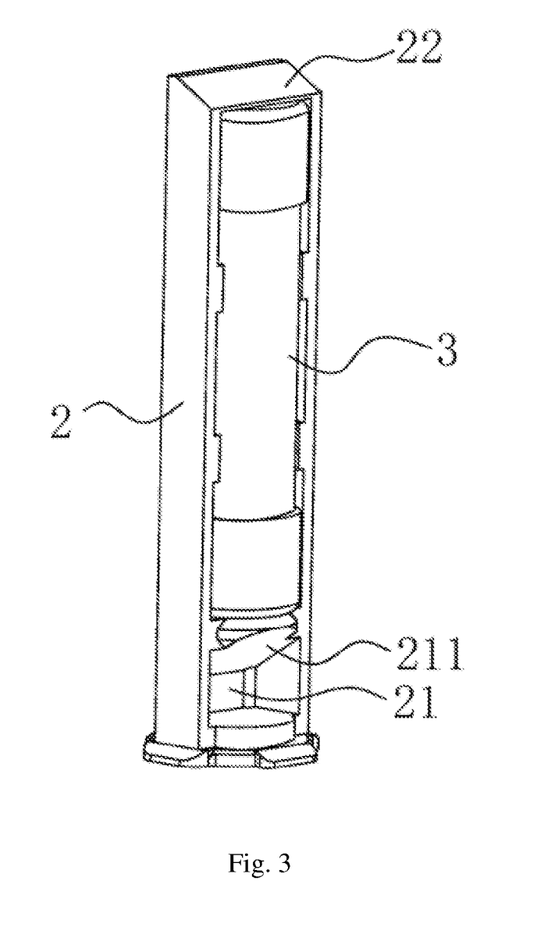
FIG. 3 is a structurally schematic view of a protective holder in the present invention.
Figure 4:
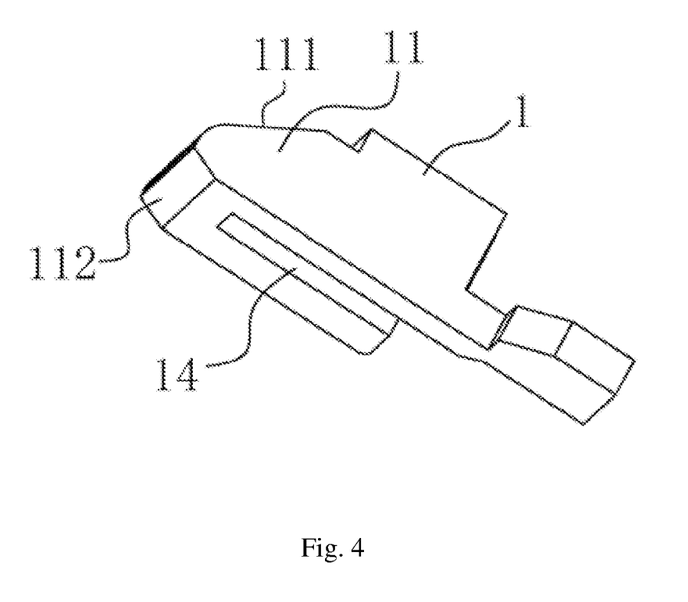
FIG. 4 is a structurally schematic view of a locking guide block in the present invention.
Figure 5:
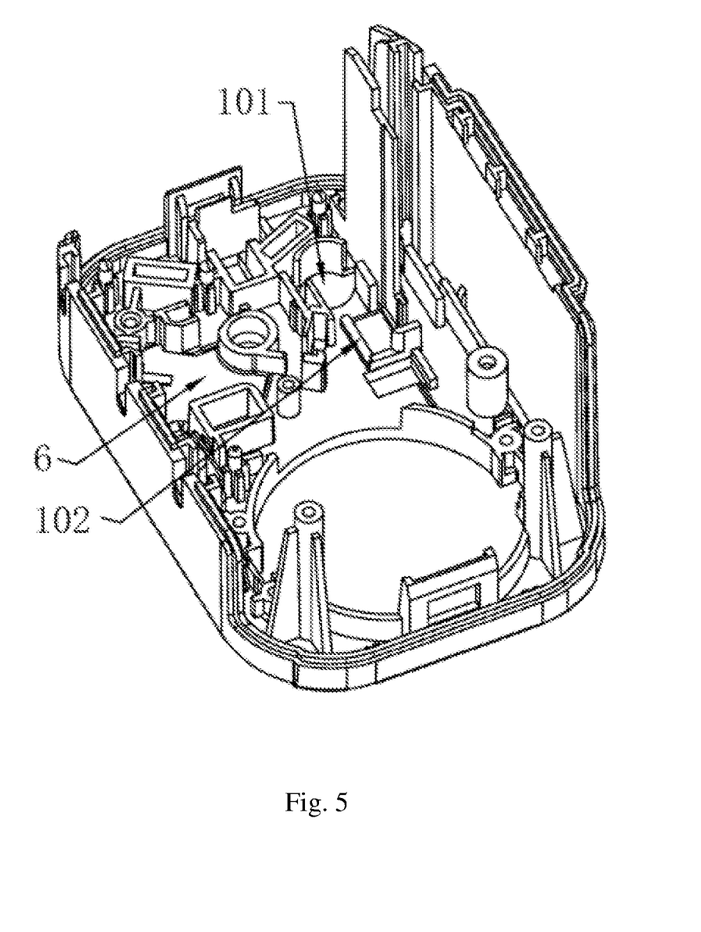
FIG. 5 is a structurally schematic view in which a guide stiffener is arranged in a power converter in the present invention.

In order to facilitate the removal of the protective holder 2 together with the protective tube 3 from the power converter for the replacement and disassembly of the protective tube, etc. as shown in FIGS. 3 and 4, the present embodiment has a first guide slope 111 formed on an upper surface of the locking part 11 of the locking guide block 1, and a second guide slope 211 matched with the first guide slope 111 formed on an upper inner wall of the locking groove 21. When it is required to pull out the protective holder 2 together with the protective tube 3, the protective holder 2 are pulled out outwards after releasing the force on the locking guide block 1. Under the action of the matching guide of the first guide slope 111 and the second guide slope 211, the protective holder 2 together with the protective tube 3 can be pulled out together, and at the same time, the locking guide block 1 is moved in the reverse direction and reset.

In order to facilitate the insertion of the protective holder 2 together with the protective tube 3 into the power converter, as shown in FIGS. 3 and 4, a third guide slope 22 is formed on an upper end surface of the protective holder 2, and a fourth guide slope 112 matched with the third guide slope 22 is formed on a lower surface of the locking part 11 of the locking guide block 1. When it is required to insert the protective holder 2 together with the protective tube 3 into the power converter, the third guide slope 22 on the protective holder 2 acts on the fourth guide slope 112 on the locking part 11 of the locking guide block 1. The locking guide block 1 can be pushed backwards under the guide action of the cooperation of the third guide slope 22 and the fourth guide slope 112, and the protective holder 2 together with the protective tube 3 can be smoothly inserted into the power converter.

In the process of inserting the protective holder 2 into the power converter, the locking guide block 1 slides backwards in the power converter. In order to improve the straightness and stability of the sliding of the locking guide block 1 in the power converter, as shown in FIGS. 4, 5, 9 and 10, this embodiment has a guide groove 14 formed on the lower end surface of the locking guide block 1, and a guide stiffener 102 movably clamped into the guide groove 14 is provided in the power converter. When the locking guide block 1 slides backwards in the power converter, under the guide action of the guide stiffener 102, the locking guide block 1 slides linearly and stably along the guide stiffener 102 in the power converter with the guide groove 14 matched with the guide stiffener 102, thereby facilitating the insertion of the protective holder 2 together with the protective tube 3 into the power converter.

Figure 6:
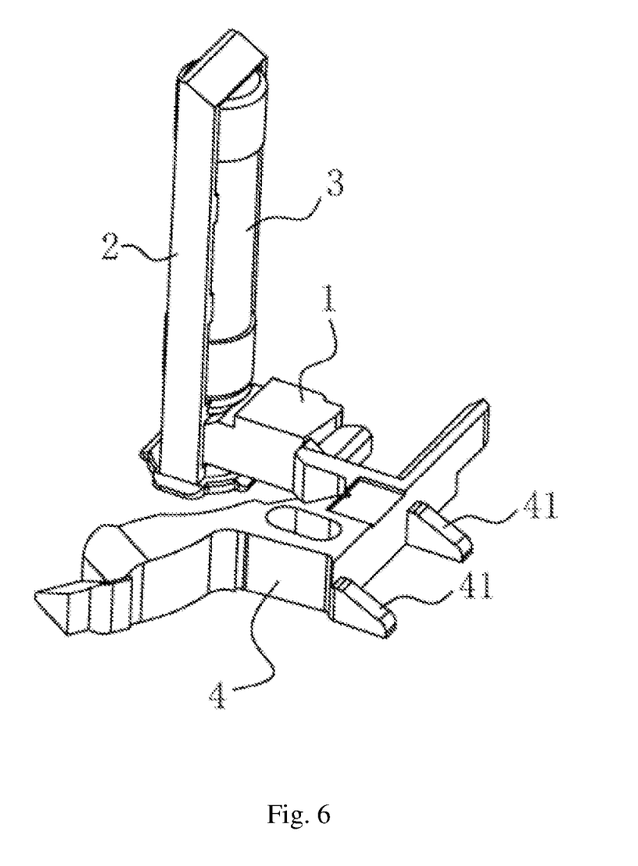
FIG. 6 is another structurally schematic view of an anti-electric shock mechanism in a locked state in the present invention.
Figure 8:
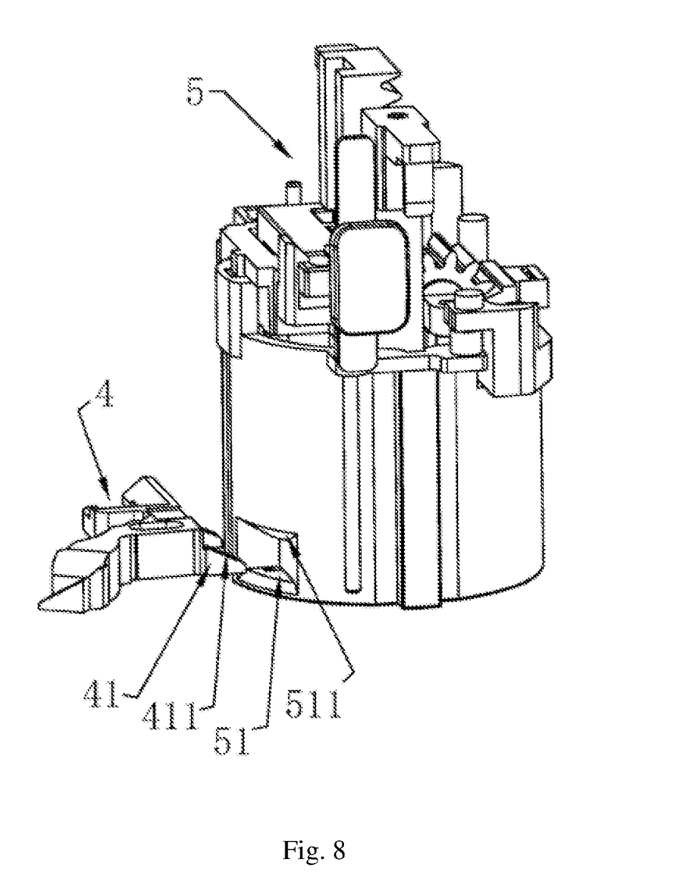
FIG. 8 is a structurally schematic view of the combination of a linkage block and an Euro-standard pin assembly in the present invention.
Figure 10:
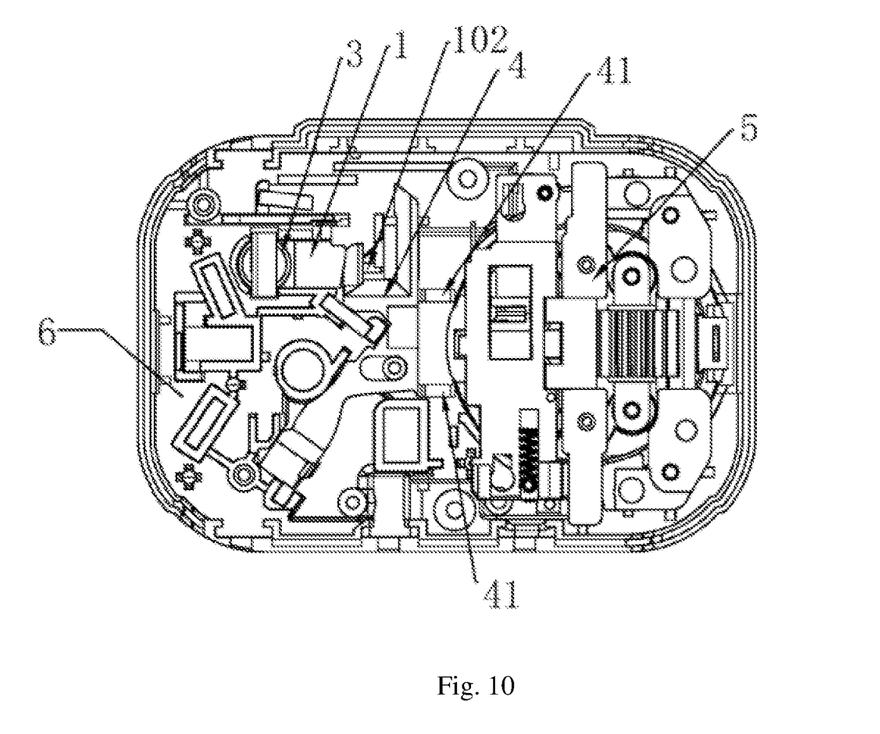
FIG. 10 is a plan view of an anti-electric shock mechanism arranged in the power converter housing and in a locked state in the present invention.

In order to facilitate the application of a force to the locking guide block 1, as shown in FIG. 6, this embodiment further includes a linkage block 4 arranged on the side of the locking guide block 1. At the same time, at least one limiting part 41 is provided on a side of the linkage block 4 away from the locking guide block 1, and the limiting part 41 is provided in the direction of the Euro-standard pin assembly 5 of the power converter, as shown in FIGS. 8-10. Preferably, the number of the limiting parts 41 in the present embodiment is two.

Meanwhile, as shown in FIG. 8, at least one avoidance groove 51 into which the limiting part 41 is clamped is formed on the outer side of the Euro-standard pin assembly 5. When the limiting part 41 is clamped in the avoidance groove 51, the following two functions are provided. Firstly, the position of the limiting part 41 is released by the avoidance groove 51, and the acting force on the locking guide block 1 is released, so that the protective holder 2 and the protective tube 3 can be pulled out for replacement and maintenance, etc. Secondly, the Euro-standard pin assembly 5 is limited by the limiting part 41, so that the Euro-standard pin assembly 5 cannot be pushed out for use.

With regard to the above-mentioned first function, specifically, when the Euro-standard pin assembly 5 is pushed out for use, the outer side of the Euro-standard pin assembly 5 applies a force towards the protective holder 2 to the limiting part 41, so that the linkage block 4 drives the locking guide block 1 to move in the direction of the protective holder 2, and thus the locking part 11 of the locking guide block 1 is inserted into the locking groove 21 of the protective holder 2, as shown in FIGS. 6, 9 and 10. Therefore, the protective holder 2 and the protective tube 3 are locked, and the protective holder 2 and the protective tube 3 cannot be pulled out from the power converter, thus improving the safety in use. Thus, when the Euro-standard pin assembly 5 is pushed out for use, the protective tube 3 can be effectively prevented from being pulled out, and the risk of electric leakage and electric shock can be reduced.

When the Euro-standard pin assembly 5 is pushed back into the power converter and the limiting part 41 meets the avoidance groove 51 on the side of the Euro-standard pin assembly 5, the limiting part 41 is embedded in the avoidance groove 51, and then the acting force on the linkage block 4 and the locking guide block 1 disappears to release the locking of the protective holder 2 and the protective tube 3. When it is required to pull out the protective holder 2 and the protective tube 3, the protective holder 2 and the protective tube 3 can be pulled out under the cooperative guiding action of the first guide slope 111 and the second guide slope 211.

Thus, the protective holder 2 and the protective tube 3 can be pulled out only if the locking of the protective holder 2 and the protective tube 3 is released when the Euro-standard pin assembly 5 is not pulled out for use, that is, the pulling out of the protective tube 3 is not affected.

Figure 11:
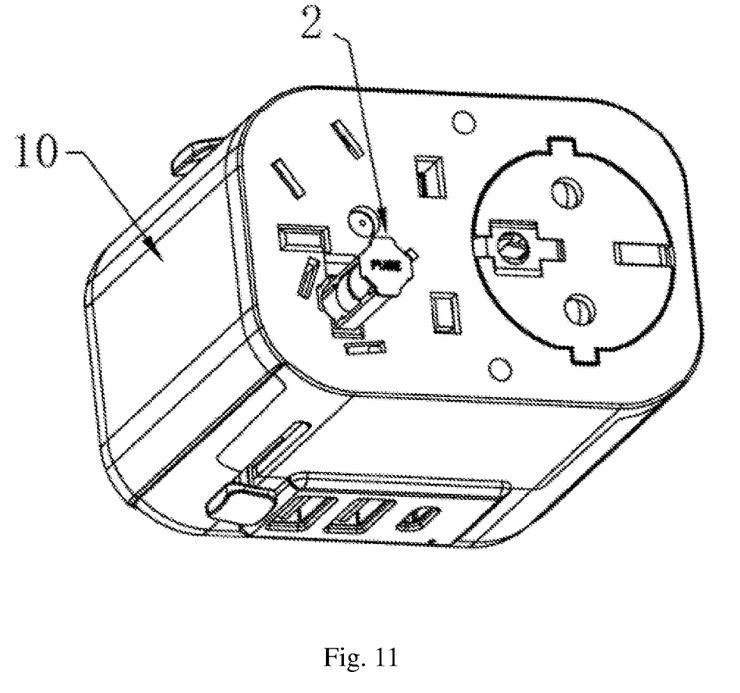
FIG. 11 is a structurally schematic view in which a protective holder and a protective tube are partially pulled out of a power converter in the present invention.

With regard to the above-mentioned second function, specifically, as shown in FIG. 11, when the protective holder 2 and the protective tube 3 are partially pulled out accidentally (for example, half pulled out), the protective holder 2 applies a force towards the Euro-standard pin assembly 5 to the locking guide block 1 and the linkage block 4, so that the limiting part 41 of the linkage block 4 is clamped into the avoidance groove 51 of the Euro-standard pin assembly 5. When the locking guide block 1 and the linkage block 4 cannot move any more, the Euro-standard pin assembly 5 is limited by the limiting part 41, so that the Euro-standard pin assembly 5 cannot be pushed out for use, thereby ensuring the safety of use. It prevents potential electric shock using the Euro-standard pin assembly 5 when protective tube 3 is partially pulled out, so as to improve the safety in use.

When the protective tube 3 is correctly mounted in the power converter, the locking part 11 of the locking guide block 1 is inserted into the locking groove 21 of the protective holder 2, the linkage block 4 can move, and the Euro-standard pin assembly 5 can be normally pushed out for use. Specifically, as shown in FIG. 8, a fifth guide slope 411 is formed on the upper surface of the limiting part 41, and a sixth guide slope 511 corresponding to the fifth guide slope 411 is formed on the upper inner wall of the avoidance groove 51. When the Euro-standard pin assembly 5 is pushed out, under the action of the matching guide of the fifth guide slope 411 and the sixth guide slope 511, the linkage block 4 moves in a direction away from the Euro-standard pin assembly 5, and then the limiting action on the Euro-standard pin assembly 5 is released. The Euro-standard pin assembly 5 can be pushed for use out of the power converter housing.

In order to simplify the internal structure of the power converter, the linkage block 4 of the present embodiment can be used as other functional components at the same time. With reference to the present invention patent document with the patent number "201922073880.6" and the patent title "a movable block assembly for a power converter", the linkage block 4 of the present embodiment can be used as a rotating block for achieving that only one type of pin can protrude out of the lower surface of the housing of the power converter when the power converter is used, achieving the purpose of using only one type of pin at the same time.

Figure 7:
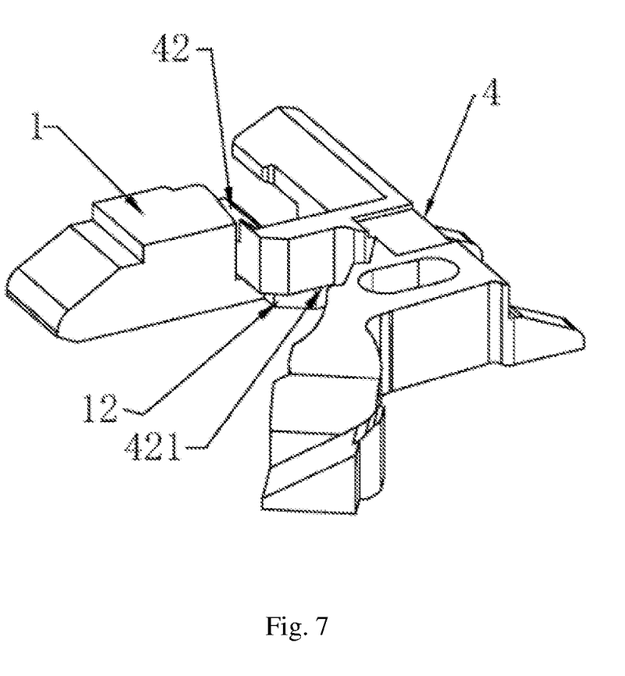
FIG. 7 is a structurally schematic view of the combination of a locking guide block and a linkage block in the present invention.

With regard to the arrangement mode between the locking guide block 1 and the linkage block 4, the present embodiment adopts a non-fixed connection mode, so that the locking guide block 1 does not affect the implementation of other functions of the linkage block 4 and does not generate interference. Specifically, as shown in FIG. 7, a moving guide block 12 is extended on an end portion of the locking guide block 1 adjacent to the linkage block 4, an acting part 42 is provided on an end portion of the linkage block 4 adjacent to the locking guide block 1, and a moving guide groove 421 in which the moving guide block 12 is inserted is formed at a bottom of the acting part 42. The mutual pushing between the locking guide block 1 and the linkage block 4 is facilitated by the combination of the moving guide block 12 on the locking guide block 1 and the moving guide groove 421 on the linkage block 4. Of course, since there is no fixed connection between the locking guide block 1 and the linkage block 4, the locking guide block 1 does not interfere with the implementation of other functions of the linkage block 4.

In the present embodiment, the locking guide block 1 and the linkage block 4 are movably arranged inside the power converter housing 6, respectively. In order to facilitate a more accurate movement of the locking guide block 1 and the linkage block 4, a corresponding movable slot can be formed in the power converter housing 6 to move the locking guide block 1 and the linkage block 4 therein, thereby improving the stability of the movement of the locking guide block 1 and the linkage block 4.

Figure 12:
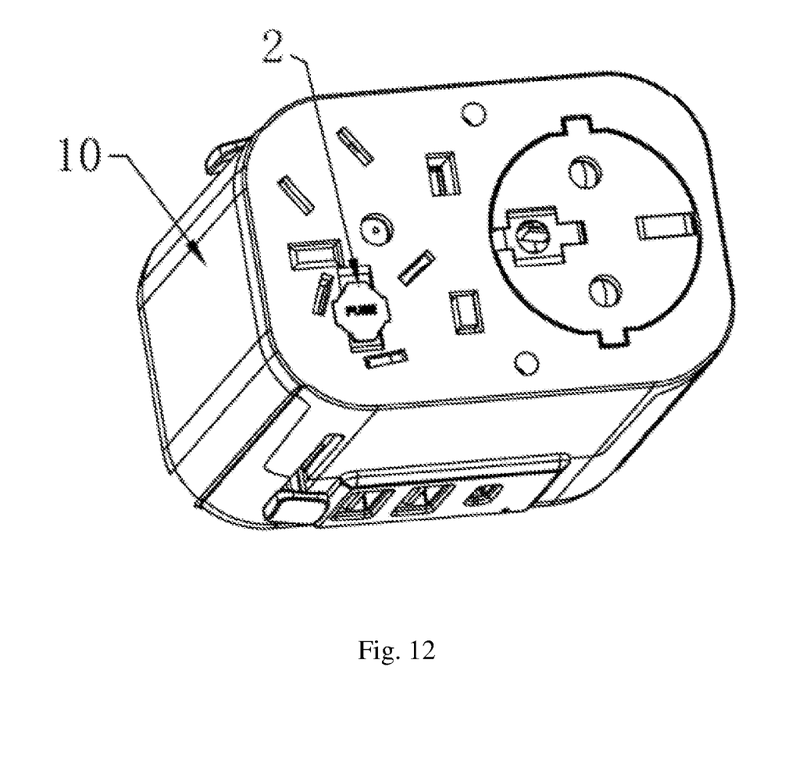
FIG. 12 is a structurally schematic view in which a protective holder and a protective tube are correctly installed in a power converter in the present invention.
Figure 13:
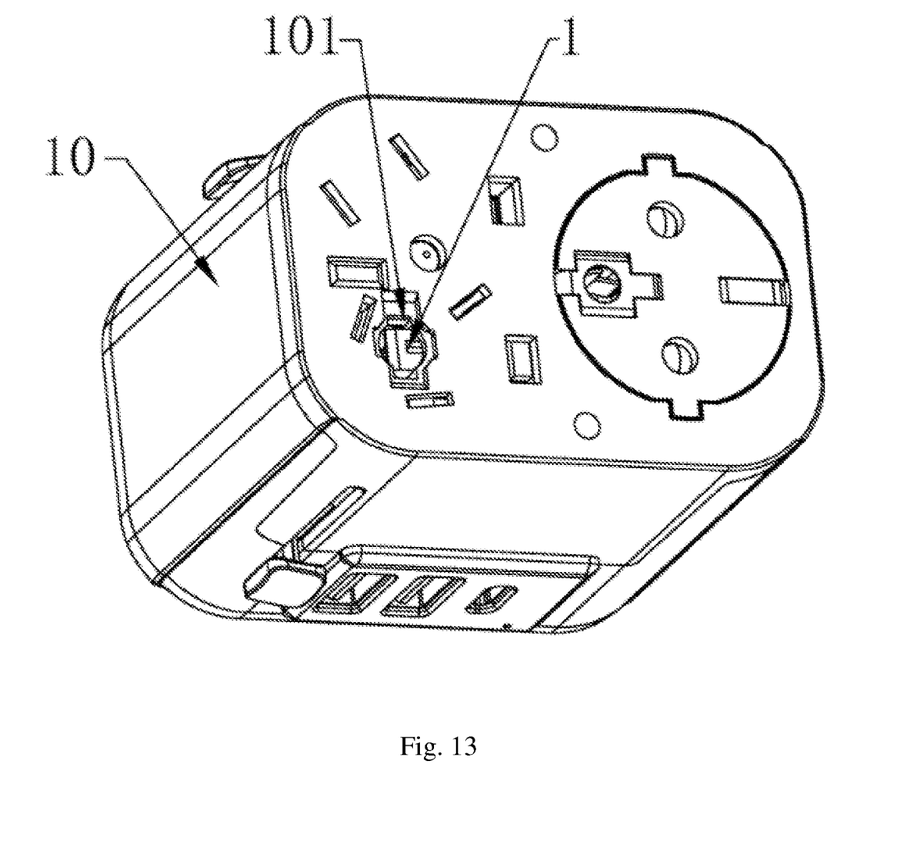
FIG. 13 is a structurally schematic view of a power converter after a protective holder and a protective tube have been completely pulled out in the present invention.

In the present embodiment, as shown in FIG. 13, a protective tube insertion hole 101 is formed at a position of the power converter 10 corresponding to the protective holder 2. When the protective holder 2 and the protective tube 3 are properly installed in the power converter 10, the protective holder 2 just fills the protective tube insertion hole 101, as shown in FIG. 12. When the protective holder 2 and the protective tube 3 are pulled out, namely, the power converter 10 is completely pulled out, as shown in FIG. 13, the Euro-standard pin assembly 5 is pushed out for use. At this moment, the Euro-standard pin assembly 5 pushes the linkage block 4, and the linkage block 4 pushes the locking guide block 1, so that the locking guide block 1 moves to the position of the protective tube insertion hole 101, and the protective tube insertion hole 101 is blocked. When the locking guide block 1 moves to the position of the protective tube insertion hole 101, the gap formed on the protective tube insertion hole 101 is less than 3 mm. That is to say, a probe with the safety standard being greater than or equal to 3 mm cannot be inserted into the gap, thus ensuring that the protective tube insertion hole 101 is not exposed and no safety hazard of electric shock occurs, meeting the safety standard and improving the safety in use.

It should be noted here that the above-mentioned Euro-standard pin assembly 5 may also be a German-pin assembly, an US-standard pin assembly or a UK-standard pin assembly, etc.

With the special structural design of the anti-electric shock mechanism of this embodiment, the anti-electric shock function can be achieved in the following three cases.

Firstly, when the protective holder 2 and the protective tube 3 are correctly installed in the power converter 10 and the Euro-standard pin assembly 5 is pushed out for use, i.e. when it is plugged in the socket and is powered on, the protective holder 2 can be locked by combining the linkage block 4 and the locking guide block 1. That is, the protective tube 3 is locked, so that the protective holder 2 and the protective tube 3 cannot be pulled out from the power converter 10 when the power converter 10 is working, thereby improving the safety of the power converter and preventing the risk of electric leakage and electric shock.

Secondly, when the protective holder 2 and the protective tube 3 have been partially pulled out, the protective holder 2 exerts a force towards the Euro-standard pin assembly 5 to the locking guide block 1 and the linkage block 4, so that the limiting part 41 of the linkage block 4 is clamped into the avoidance groove 51 of the Euro-standard pin assembly 5, and the locking guide block 1 and the linkage block 4 cannot move any more. Then the limiting part 41 limits the Euro-standard pin assembly 5, so that the Euro-standard pin assembly 5 cannot be pushed out for use, thereby ensuring the safety of use, preventing the Euro-standard pin assembly 5 pushed out from having a potential electric shock hazard when the protective holder and the protective tube are partially pulled out, and improving the use safety.

Thirdly, when the protective holder 2 and the protective tube 3 have been completely pulled out from the power converter 10, the Euro-standard pin assembly 5 is pushed out for use; at this moment, the Euro-standard pin assembly 5 pushes the linkage block 4, and the linkage block 4 pushes the locking guide block 1, so that the locking guide block 1 moves to the position of the protective tube insertion hole 101, and the protective tube insertion hole 101 is blocked. When the locking guide block 1 moves to the position of the protective tube insertion hole 101, the gap formed on the protective tube insertion hole 101 is less than 3 mm. That is to say, a probe with the safety standard being greater than or equal to 3 mm cannot be inserted into the gap, thereby ensuring that the protective tube insertion hole 101 is not exposed, and preventing a potential safety hazard of electric shock from occurring. It conforms to safety standards and improves safety in use.

In the description above, only the preferred embodiments of the present present invention has been described, and the technical scope of the present present invention is not limited in any way. Therefore, other structures obtained by adopting the same or similar technical features as those of the above embodiments of the present invention are within the scope of the present present invention.

What is claimed is:

1. An anti-electric shock mechanism for a power converter, comprising
   a protective tube provided in the power converter,
   a locking guide block provided in the power converter, and
   a protective holder for mounting the protective tube, wherein
   a locking groove is formed on the protective holder, and a locking part inserted into the locking groove is provided on the locking guide block;
   a first guide slope is formed on an upper surface of the locking part of the locking guide block, and a second guide slope matched with the first guide slope is formed on an upper inner wall of the locking groove.

2. The anti-electric shock mechanism for the power converter according to claim 1, characterized in that the locking guide block is provided on a side of the locking groove.

3. The anti-electric shock mechanism for the power converter according to claim 1, characterized in that a protective tube insertion hole is formed at a position of the power converter corresponding to the protective holder, and a gap formed on the protective tube insertion hole is less than 3 mm when the protective tube is pulled out and the locking guide block is moved to the position of the protective tube insertion hole.

4. The anti-electric shock mechanism for the power converter according to claim 1, characterized in that a third guide slope is formed on an upper end face of the protective holder, and a fourth guide slope matched with the third guide slope is formed on a lower surface of the locking part of the locking guide block.

5. The anti-electric shock mechanism for the power converter according to claim 4, further comprising a linkage block provided on a side of the locking guide block; wherein
   at least one limiting part is provided on a side of the linkage block away from the locking guide block; at least one avoidance groove for the limiting part to be clamped is formed on an outer side of the Euro-standard pin assembly;
   a fifth guide slope is formed on an upper surface of the at least one limiting part, and a sixth guide slope corresponding to the fifth guide slope is formed on an upper inner wall of the at least one avoidance groove.

6. A anti-electric shock mechanism for the power converter, comprising
   a protective tube provided in the power converter,
   a locking guide block provided in the power converter, and
   a protective holder for mounting the protective tube, wherein
   a locking groove is formed on the protective holder, and a locking part inserted into the locking groove is provided on the locking guide block;
   a guide groove is formed at a lower end surface of the locking guide block, and a guide stiffener movably clamped into the guide groove is provided in the power converter.

7. A anti-electric shock mechanism for the power converter, comprising
   a protective tube provided in the power converter, a locking guide block provided in the power converter, and a protective holder for mounting the protective tube, wherein a locking groove is formed on the protective holder, and a locking part inserted into the locking groove is provided on the locking guide block;

the anti-electric shock mechanism further comprises a linkage block provided on a side of the locking guide block.

8. The anti-electric shock mechanism for the power converter according to claim 7, characterized in that at least one limiting part is provided on a side of the linkage block away from the locking guide block, and the limiting part is provided in the direction of an Euro-standard pin assembly of the power converter; at least one avoidance groove for the limiting part to be clamped is formed on an outer side of the Euro-standard pin assembly.

9. The anti-electric shock mechanism for the power converter according to claim 7, characterized in that the linkage block is provided separately from the locking guide block.

10. The anti-electric shock mechanism for the power converter according to claim 7, characterized in that a moving guide block is extended on an end portion of the locking guide block adjacent to the linkage block, an acting part is provided on an end portion of the linkage block adjacent to the locking guide block, and a moving guide groove in which the moving guide block is inserted is formed at a bottom of the acting part.

\* \* \* \* \*